US012808721B2

(12) United States Patent
Slobinsky et al.

(10) Patent No.: US 12,808,721 B2
(45) Date of Patent: Nov. 24, 2026

(54) THERMALLY ISOLATED SENSOR ARRANGEMENT FOR IMAGING AN OBJECT OF INTEREST WITHIN A CRYOGENIC ENVIRONMENT AND METHOD OF MANUFACTURING THE SAME

(71) Applicants: CRINSURANCE S.A.S., La Plata (AR); NATIONAL SCIENTIFIC AND TECHNICAL RESEARCH COUNCIL (CONICET), Caba (AR)

(72) Inventors: Demian Gustavo Slobinsky, Hudson (AR); Juan Pablo Peralta, La Plata (AR)

(73) Assignees: CRINSURANCE S.A.S., La Plata (AR); NATIONAL SCIENTIFIC AND TECHNICAL RESEARCH COUNCIL (CONICET), Caba (AR)

( * ) Notice: Subject to any disclaimer, the term of this patent is extended or adjusted under 35 U.S.C. 154(b) by 225 days.

(21) Appl. No.: 18/271,122

(22) PCT Filed: Jan. 12, 2022

(86) PCT No.: PCT/IL2022/050052
§ 371 (c)(1),
(2) Date: Jul. 6, 2023

(87) PCT Pub. No.: WO2022/153304
PCT Pub. Date: Jul. 21, 2022

(65) Prior Publication Data

US 2024/0027274 A1 Jan. 25, 2024

Related U.S. Application Data

(60) Provisional application No. 63/136,655, filed on Jan. 13, 2021.

(51) Int. Cl.
*G01J 5/04* (2006.01)
*B25J 1/04* (2006.01)
(Continued)

(52) U.S. Cl.
CPC ................. *G01J 5/045* (2013.01); *B25J 1/04* (2013.01); *B25J 19/021* (2013.01); *G01J 2005/0077* (2013.01); *H04N 23/52* (2023.01)

(58) Field of Classification Search
CPC .... G01J 5/045; G01J 2005/0077; G01J 5/041; G01J 5/047; G01J 5/06; B25J 1/04;
(Continued)

(56) References Cited

U.S. PATENT DOCUMENTS 5,647,228 A * 7/1997 Sager .................. G05D 23/126 62/51.1
7,332,720 B2 2/2008 Minarik et al.
(Continued)

FOREIGN PATENT DOCUMENTS

CN 101854476 A 10/2010
CN 103354593 A 10/2013
(Continued)

OTHER PUBLICATIONS https://iopscience.iop.org/article/10.1088/1748-0221/8/12/T12001 Delaquis (Year: 2013).*
(Continued)

*Primary Examiner* — Hugh Maupin
(74) *Attorney, Agent, or Firm* — Sterne, Kessler, Goldstein & Fox P.L.L.C.

(57) ABSTRACT

A thermally isolated sensor arrangement for imaging an object of interest within a cryogenic environment comprises: (a) a sensor configured for imaging the object of interest; (b) a light source configured for illuminating the object of interest; (c) a vacuum sealed housing accommodating the
(Continued)

sensor and light source; the housing having an aperture and an optical window mounted within the aperture; and (d) means for securing the sensor and light source within the housing. The means for securing the sensor and light source further comprises a wire suspension characterized by low thermal conductivity.

12 Claims, 12 Drawing Sheets

(51) Int. Cl.
*B25J 19/02* (2006.01)
*G01J 5/00* (2022.01)
*H04N 23/52* (2023.01)

(58) Field of Classification Search
CPC ....... B25J 19/021; H04N 23/52; H04N 23/51; H04N 23/56; B25B 9/00; F16B 21/02
See application file for complete search history.

(56) References Cited

U.S. PATENT DOCUMENTS

| | | | | |
|---|---|---|---|---|
| 8,833,130 | B2 | 9/2014 | Matsunaga et al. | |
| 10,989,450 | B1 * | 4/2021 | Hehlen | H01S 3/025 |
| 2005/0078208 | A1 | 4/2005 | Minarik et al. | |
| 2007/0084221 | A1 * | 4/2007 | Ruocco-Angari | G01J 5/0205 220/560.04 |
| 2011/0031969 | A1 * | 2/2011 | Kitching | G01R 33/032 324/304 |
| 2019/0133113 | A1 | 5/2019 | Craig | |
| 2020/0107541 | A1 * | 4/2020 | Blair | G01K 1/024 |
| 2020/0229427 | A1 * | 7/2020 | Kilbride | A01N 1/145 |
| 2021/0032034 | A1 * | 2/2021 | Kalouche | B25J 9/1612 |
| 2022/0087253 | A1 * | 3/2022 | Gupta | A01N 1/14 |
| 2022/0221476 | A1 * | 7/2022 | Craven | G01N 35/04 |
| 2023/0031233 | A1 * | 2/2023 | Grabau | F25B 31/023 |

FOREIGN PATENT DOCUMENTS

| | | | |
|---|---|---|---|
| CN | 111121374 | A | 5/2020 |
| JP | H08172557 | A | 7/1996 |
| JP | H08172558 | A | 7/1996 |
| JP | 2013105034 | A | 5/2013 |
| WO | 2018073242 | A1 | 4/2018 |

OTHER PUBLICATIONS https://www.spiedigitallibrary.org/conference-proceedings-of-spie/9144/91440Y/Large-high-impedance-silicon-micro-calorimeters-for-x-rays-camera/10.1117/12.2056312.full Sauvegot et al (Year: 2014).*

Delaquis et al. (2013). Development of a camera casing suited for cryogenic and vacuum applications. Journal of Instrumentation. 8. DOI: 10.1088/1748-0221/8/12/T12001.

Sauvageot et al. (2014). Large high impedance silicon μ-calorimeters for x-rays camera: status and perspectives. Proceedings SPIE 9144, , Space Telescopes and Instrumentation 2014: Ultraviolet to Gamma Ray, 91440Y (Jul. 24, 2014); https://doi.org/10.1117/12.2056312.

Voellmer et al. (2023) A kinematic, Kevlar suspension system for an ADR. Available online: https://ntrs.nasa.gov/api/citations/20030052215/downloads/20030052215.pdf.

PCT International Search Report for International Application No. PCT/IL2022/050052, mailed May 30, 2022, 6pp.

PCT Written Opinion for International Application No. PCT/IL2022/050052, mailed May 30, 2022, 8pp.

PCT International Preliminary Report on Patentability for International Application No. PCT/IL2022/050052, completed Jul. 6, 2023, 10pp.

Delaquis, S. & Gornea, R. & Janos, Stefan & Lüthi, M. & Rohr, Ch & Schenk, Michael & Vuilleumier, Jean-Luc. (2013). Development of a camera casing suited for cryogenic and vacuum applications. Journal of Instrumentation. 8. 10.1088/1748-0221/8/12/T12001.

E. Castillo-Domínguez, D. Ferrusca Rodríguez, S. Tulloch, M. Velázquez, E. Carrasco, J. Gallego, A. Gil de Paz, F. M. Sanchez, and J. M. Vilchez Medina “Cryostat and CCD for MEGARA at GTC”, Proc. SPIE 8446, Ground-based and Airborne Instrumentation for Astronomy IV, 84465Y (Sep. 24, 2012); https://doi.org/10.1117/12.925398.

Voellmer, George & Jackson, Michael & Shirron, Peter & Tuttle, James. (2003). Kinematic Kevlar suspension system for the HAWC and Safire ADR salt pills. Proceedings of SPIE—The International Society for Optical Engineering. 4850. 1070-1079.

European Patent Office, Extended European Search Report for European Patent Application No. 22739262.8, dated Jan. 10, 2025, 11pp.

* cited by examiner

THERMALLY ISOLATED SENSOR ARRANGEMENT FOR IMAGING AN OBJECT OF INTEREST WITHIN A CRYOGENIC ENVIRONMENT AND METHOD OF MANUFACTURING THE SAME

CROSS REFERENCE TO RELATED APPLICATIONS

This application is a National Phase of PCT Patent Application No. PCT/IL2022/050052 having International filing date of Jan. 12, 2022, which claims the benefit of priority of U.S. Provisional Patent Application No. 63/136,655, filed Jan. 13, 2021, the contents of which are all incorporated herein by reference in their entirety.

FIELD OF THE INVENTION

The present invention relates to cryogenic imaging systems and, more particularly, to systems for inspecting internal environment of cryogenic storage devices and identifying stored objects within the cryogenic environment.

BACKGROUND OF THE INVENTION

The main part of energy consumed by a cryogenic storage device is used for cooling the internal environment. Insertion of any energy-emitting element results in energy expenditures. Nevertheless, the internal environment of cryogenic storage device should be visually inspected in a periodic manner. The stored objects are placed and retrieved under visual control either. Since the camera system includes metallic housing, electric circuit hoards and lights as heat source, conduction and convection phenomena heat up the internal environment of the cryogenic storage device.

It should be emphasized that commercially available CMOS cameras are operable up to temperature −50 C. The standard practice in physics experiments is adding a heating resistor to ensure the operable temperature of the sensor.

When the device is cooled with a cryogen (liquid nitrogen, liquid argon, liquid helium, etc.), the input power added by the imaging system and heating resistor increases boiling off. In huge cryogenic storage such as liquid natural gas, or liquid argon particle physics experiments, this is not a big issue given that one can afford evaporating some liquid.

The advantage of large vessel vanishes as the cryogen has lower heat capacity and/or the vessel is smaller. In this case every watt of cooling power becomes important to extend the cooling lifespan without refilling or recondensing.

For small vessels it is hence desirable to thermally isolate the imaging system in order to rely on the self-heating effect to ensure normal operation condition for the CMOS element and electronics.

U.S. Pat. No. 7,332,720 discloses a cold shield reflecting external thermal radiation away from the cryogenic camera, so as to shield the cryogenic camera in a cryogenic temperature such that no internal thermal radiation will be generated. The cryogenic camera has a lens assembly and a focal plane array.

In order to improve efficiency of cooling the cryogenic storage device, thermal isolation of energy-emitting elements insertable into the internal environment of the cryogenic storage device should be minimized. Thus, there is a long-felt and unmet need to provides a cryogenic camera and LED arrangement having minimal contact with the internal cryogenic environment based on the self-heating effect to minimize input power, yet obtaining specified temperature operating conditions for the commercially available CMOS and electronic sensor arrangement.

SUMMARY OF THE INVENTION

It is hence one object of the invention to disclose a thermally isolated sensor arrangement for imaging an object of interest within a cryogenic environment. The aforesaid cryogenic arrangement comprises: (a) a sensor configured for imaging the object of interest; (b) a light source configured for illuminating the object of interest; (c) a vacuum-sealed housing accommodating the sensor and light source; the housing having an aperture and an optical window mounted within the aperture; and (d) means for securing the sensor and light source within the housing.

It is a core purpose of the invention to provide the means for securing the sensor and light source further comprising a wire suspension characterized by low thermal conductivity.

Another object of the invention is to disclose the cryogenic environment which is a cryogenic device for storing biological objects.

A further object of the invention is to disclose the biological object selected from the group consisting of a seminal fluid, an embryo, an egg and any combination thereof.

A further object of the invention is to disclose, wherein an internal wall of said vacuum-sealed housing with film-shaped aluminized biaxially-oriented polyethylene terephthalate.

A further object of the invention is to disclose the wire suspension made of polyparaphenylene terephthalamide or polyamide fibers.

A further object of the invention is to disclose the optical window made of quartz and glued within the aperture by means of an epoxy encapsulant.

A further object of the invention is to disclose the sensor which is a CMOS sensor.

A further object of the invention is to disclose the light source which is an array of light emitting diodes.

A further object of the invention is to disclose the array annularly shaped around the sensor.

A further object of the invention is to disclose the grasper comprising a tubular member and a shaft accommodated within the tubular member. The shaft has a proximal end and a distal end thereof; the proximal end is provided with a handle for manually rotating the shaft relating to the tubular member. The gasper further comprises a bevel gear secured to the tubular member. The bevel gear comprises a pinion and an idle gear. The pinion is mechanically connected to the distal end of the shaft. The idle gear mechanically connected to a spindle bracketed to the tubular member. The spindle carries a coiled spring having a pitch thereof effective for grasping and releasing the object of interest by a resilient manner. The object of interest when located on an internal bottom surface of the cryogenic environment is graspable by pressing the object of interest between spring coils. The grasper further comprises a stop member. The object of interest when grasped is manually rotatable by means of the handle via the shaft and the bevel gear till achieving a mechanic contact with the stop releasing the object of interest from the spring.

A further object of the invention is to disclose a thermally isolated arrangement for manipulating an object of interest within a cryogenic environment. The aforesaid arrangement comprises: (a) a grasper configured for placing the object of interest into the cryogenic environment and retrieving the object of interest therefrom; (b) a cryogenic arrangement for imaging an object of interest within a cryogenic storing device; the cryogenic arrangement comprising: (i) a sensor configured for imaging the object of interest; (ii) a light source configured for illuminating the object of interest; (iii) a vacuum-sealed housing accommodating the sensor and light source; the housing having an aperture and an optical window mounted within the aperture; (iv) means for securing the sensor and light source within the housing; (v) means for displaying the object of interest captured by the sensor. The means for securing the sensor and light source further comprises a wire suspension characterized by low thermal conductivity.

A further object of the invention is to disclose a method of imaging an object of interest within a cryogenic environment and manipulating thereof. The aforesaid method comprises steps of: (a) providing thermally isolated arrangement for manipulating an object of interest within a cryogenic environment; the arrangement comprising: (i) a grasper configured for placing the object of interest into the cryogenic environment and retrieving the object of interest therefrom; (ii) a cryogenic arrangement for imaging an object of interest within a cryogenic storing device; the cryogenic arrangement comprising: (1) a sensor configured for imaging the object of interest; (2) a light source configured for illuminating the object of interest; (3) a vacuum-sealed housing accommodating the sensor and light source; the housing having an aperture and an optical window mounted within the aperture; (4) means for securing the sensor and light source within the housing; (5) means for displaying the object of interest captured by the sensor; the means for securing the sensor and light source further comprises a wire suspension characterized by low thermal conductivity; (b) performing a step selected from the group consisting of: grasping the biological object by the grasper; placing the biological object into the cryogenic environment; imaging the biological object within the cryogenic environment; retrieving the biological object from the cryogenic environment and any combination thereof.

A further object of the invention is to disclose a method of manufacturing a thermally isolated sensor arrangement for imaging an object of interest within a cryogenic environment. The aforesaid method comprises steps of: (a) providing components of the thermally isolated sensor arrangement comprising: (i) a sensor configured for imaging the object of interest; (ii) a light source configured for illuminating the object of interest; (iii) a sealable housing accommodating the sensor and light source; the housing having an aperture and an optical window mounted within the aperture; the sealable housing having two parts configured for cooperatively forming a sealed housing; (iv) means for securing the sensor and light source within the housing further comprising a wire suspension characterized by low thermal conductivity; (v) means for sealing the thermally isolated sensor arrangement further comprising an O-ring and an epoxy encapsulating material; (vi) means for thermally isolating the sensor arrangement from the cryogenic environment; the means for thermally isolating further comprising film-shaped aluminized biaxially-oriented polyethylene terephthalate; (b) lining the an internal wall of the sealable housing with film-shaped aluminized biaxially-oriented polyethylene terephthalate; (c) suspending the sensor and light source within the sealable housing; (d) placing the O-ring between the two parts of the sealable housing; (e) vacuuming the sealable housing; and (f) sealing the sealable housing by means of the epoxy encapsulating material.

A further object of the invention is to disclose the O-ring plated with Silver-Indium.

A further object of the invention is to disclose a method of manipulating an object of interest in a cryogenic environment comprising: (a) providing a grasper for manipulating an object of interest in a cryogenic environment; the grasper comprising a tubular member and a shaft accommodated within the tubular member; the shaft has a proximal end and a distal end thereof; the proximal end is provided with a handle for manually rotating the shaft relating to the tubular member; the gasper further comprises a bevel gear secured to the tubular member; the bevel gear comprises a pinion and an idle gear; the pinion is mechanically connected to the distal end of the shaft; the idle gear mechanically connected to a spindle bracketed to the tubular member; the spindle carries a coiled spring having a pitch thereof effective for grasping and releasing the object of interest by a resilient manner; the object of interest when located on an internal bottom surface of the cryogenic environment is graspable by pressing the object of interest between spring coils; the grasper further comprises a stop member; the object of interest when grasped is manually rotatable by means of the handle via the shaft and the bevel gear till achieving a mechanic contact with the stop and releasing the object of interest from the spring; (b) providing a thermally isolated sensor arrangement for imaging an object of interest within a cryogenic environment; the arrangement comprising: (i) a sensor configured for imaging the object of interest; (ii) a light source configured for illuminating the object of interest; (iii) a vacuum-sealed housing accommodating the sensor and light source; the housing having an aperture and an optical window mounted within the aperture; and (iv) a display connected to the sensor and configured for visualizing the cryogenic environment captured by the sensor; (c) securing the grasper and thermally isolated sensor arrangement within the cryogenic arrangement; (d) grasping the object of interest located on the bottom internal bottom surface of the cryogenic environment pressing the object of interest between spring coils; (e) manipulating the object of interest into a field of view of the thermally isolated sensor arrangement; (f) visually identifying the object of interest on the display; (g) alternatively manipulating the object of interest outwards the cryogenic environment or releasing the object of interest from the spring within the cryogenic environment by means of manually rotating the spring till achieving a mechanic contact of the object of interest with the stop.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a sensor arrangement for imaging an object of interest within a cryogenic environment and an arrangement for manipulating an object of interest within a cryogenic environment.

Figure 1:
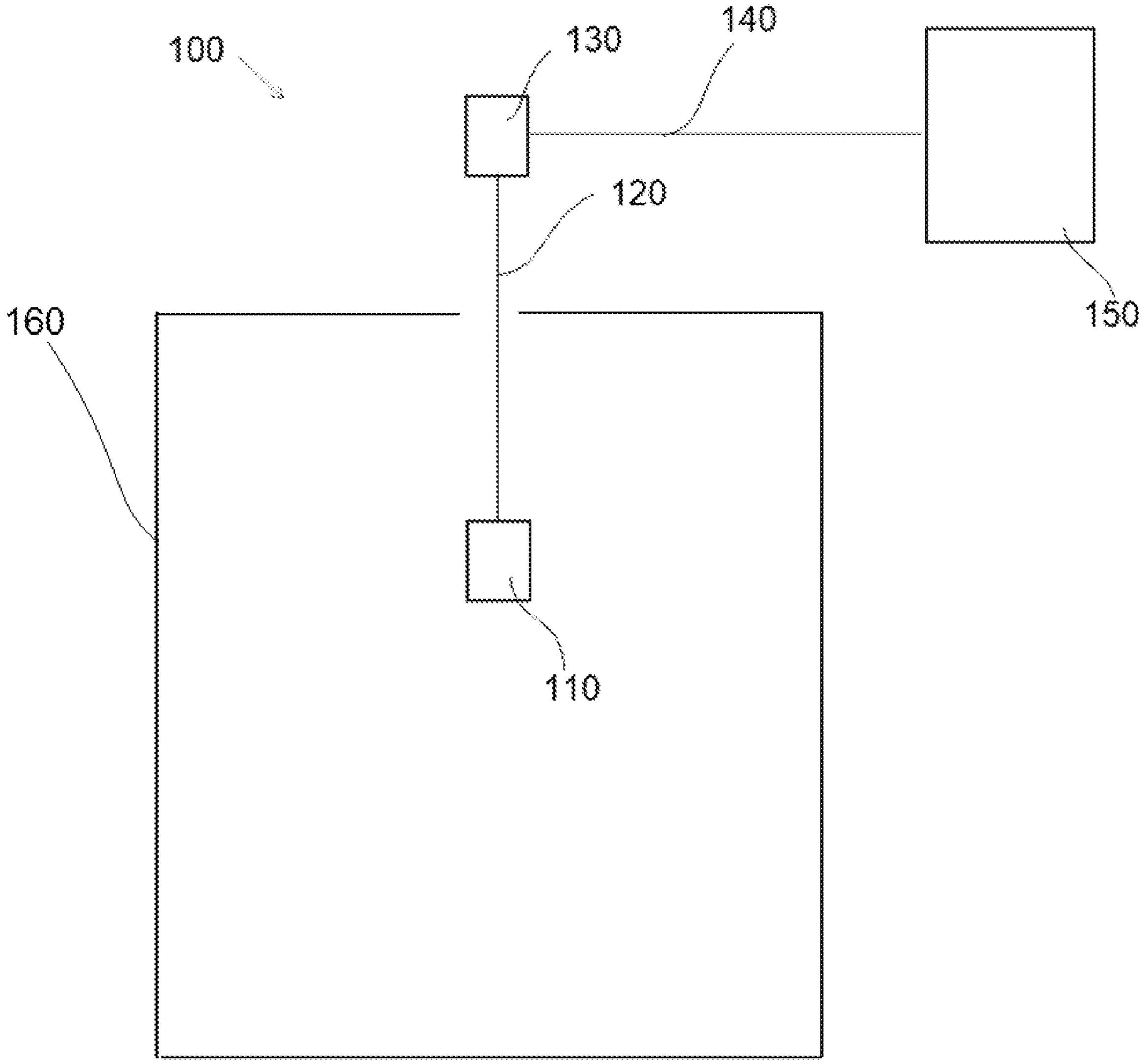
FIG. 1 is a schematic diagram of a thermally isolated sensor arrangement for imaging an object of interest within a cryogenic environment.

Reference is now made to FIG. 1 presenting sensor arrangement 100 for imaging an object of interest within cryogenic environment 160. Numeral 110 refers to an arrangement insertable inward cryogenic environment 160 and including a CMOS sensor and an illuminator (not shown). The video signal from CMOS sensor is received by controller 130 via cable FPC 120. The obtained real-time video is displayed by display 150 connected to controller 130 by cable 140.

Figure 2A:
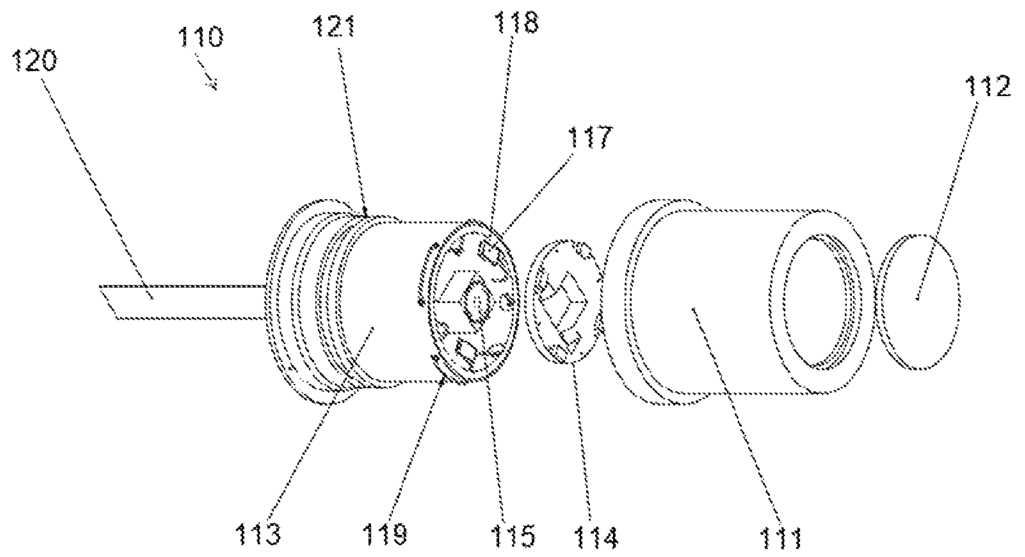
FIGS. 2*a* and 2*b* are partially exploded isometric views of a thermally isolated sensor arrangement for imaging an object of interest within a cryogenic environment.
Figure 2B:
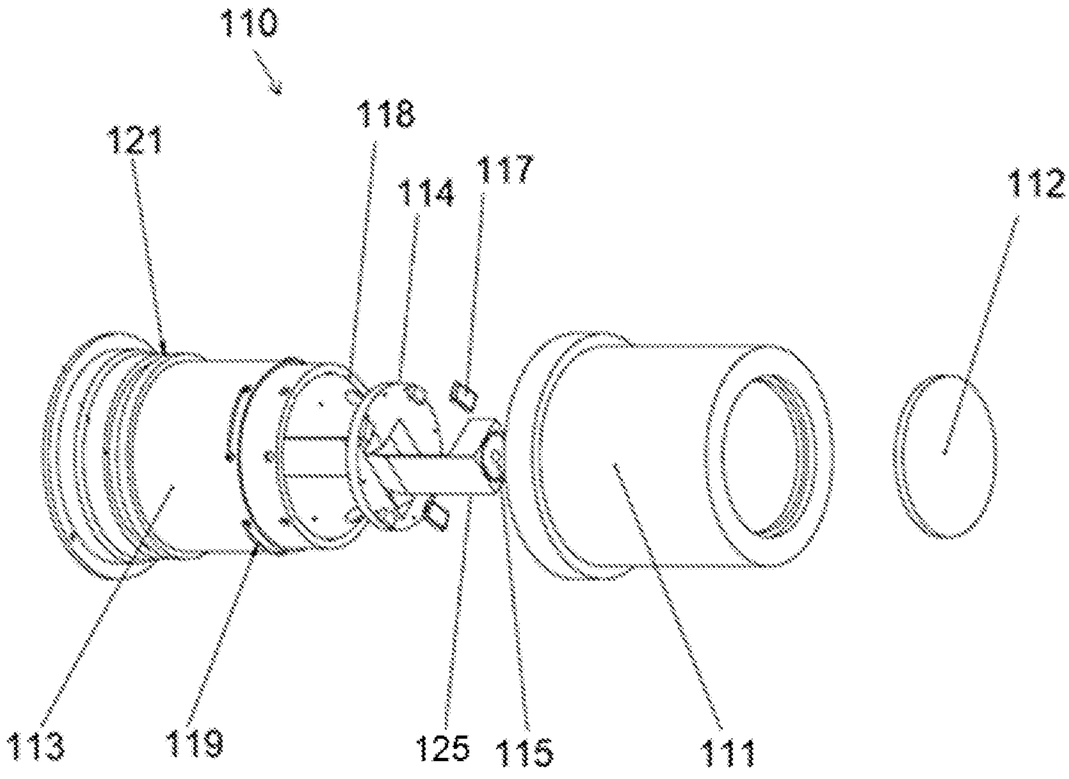
Figure 2C:
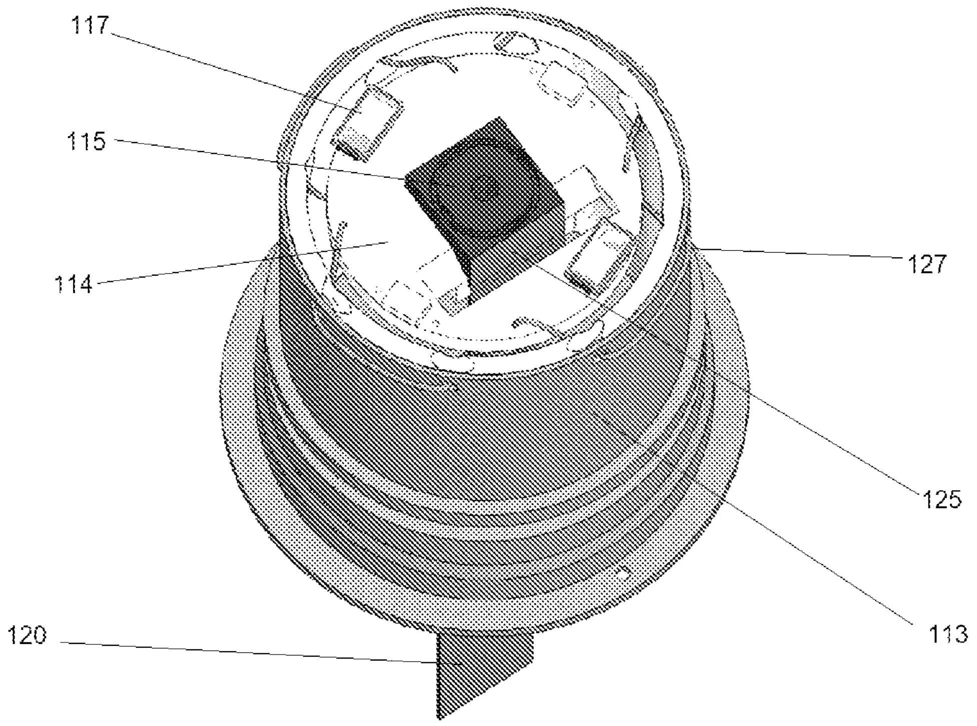
FIG. 2*c* is an enlarged isometric view of a thermally isolated sensor arrangement for imaging an object of interest within a cryogenic environment.

Reference is now made to FIGS. 2*a* to 2*c* showing insertable arrangement 110 comprising internal housing member 113, cover 111 with an optically transparent window such as quartz 112 and CMOS sensor 115. LEDs 117 are annularly arranged around CMOS sensor 115. CMOS sensor 115 and LEDs 117 are integrally secured within internal housing member 113 by means of polyparaphenylene terephthalamide (Kevlar) or polyamide fibers 119 characterized by low thermal conductivity and high strength at low temperatures. Groove 121 is designed for placing a sealing O-ring (not shown).

The O-ring is used for vacuum sealing (<10^−5 mbar) the arrangement at room temperature. Then, the space between internal housing member 113 and cover 111 is filled with epoxy encapsulant to prevent the arrangement from leaking at cryogenic temperatures because the o-ring is prone to crack at low temperatures. According to one embodiment of the present invention, the o-ring is plated with silver-indium.

According to another embodiment of the present invention, internal housing member 113 and cover 111 can be joined screws and sealed by Indium.

An internal wall of internal housing member 113 is lined by aluminized mylar sheets 118 to reduce heat losses from CMOS sensor 115 towards the exterior.

Figure 3:
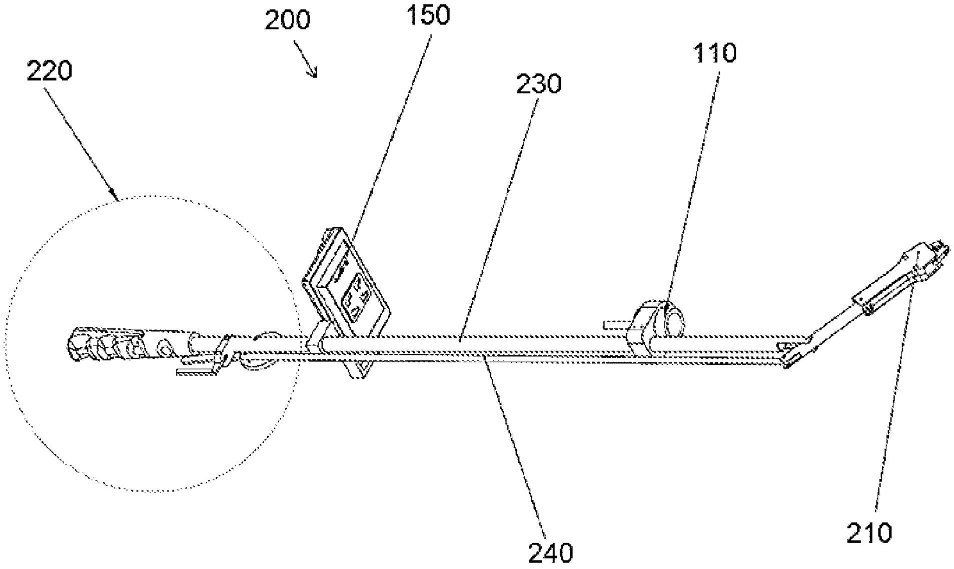
FIG. 3 is a schematic isometric view of a thermally isolated arrangement for manipulating an object of interest within a cryogenic environment.
Figure 4:
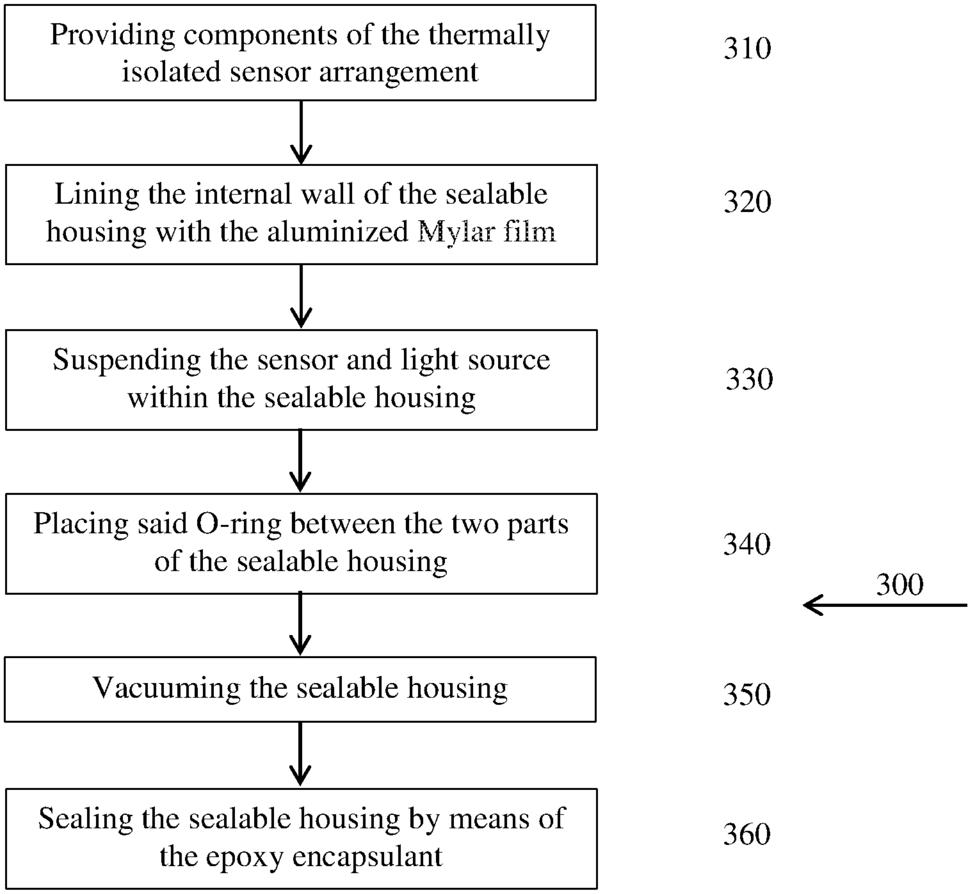
FIG. 4 is a flowchart of a method of manufacturing a thermally isolated sensor arrangement for imaging an object of interest within a cryogenic environment.

Reference is now made to FIG. 3 presenting arrangement 200 for manipulating an object of interest within a cryogenic environment. Arrangement 200 comprises bearing rod 240, grasper 210 and control handles 220. Grasper 210 is mechanically connected to control handles 220 by means of bar 240. The CMOS sensor providing an image of the cryogenic environment and illuminator configured for illuminating the objects of interests are accommodated in arrangement 110. Display 150 is configured for presenting the captured image to a user. The portion of arrangement 200 carrying elements 210 and 110 is insertable into the cryogenic environment (not shown) while display 150 and control handles 220 stays outside and allow manipulating an object of interest within the cryogenic environment.

Embodiments 100 and 200 are designed for inspecting and manipulating the objects of interest such as biological objects, specifically, frozen seminal fluid, embryos and eggs contained in vials or special-purpose holders (cryotop, cryolock, rapid-I, etc.). The present invention solves the technical problem of visual control of placing these objects into the cryogenic environment, inspecting them during storage and retrieving them from the cryogenic environment in order to exclude any mistakes.

Figure 5:
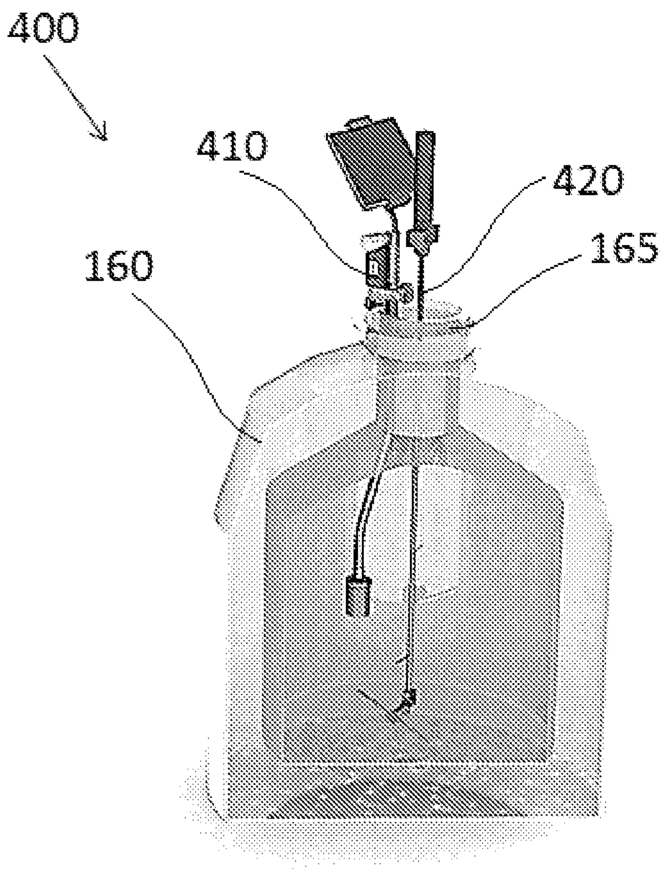
FIG. 5 is a schematic view of a thermally isolated sensor arrangement and a grasper mounted in a cryogenic environment, respectively.

Reference is now made to FIG. 5 presenting an exemplary embodiment 400 including cryogenic environment 160, sensor arrangement 410 to for imaging an object of interest and grasper 420 secured within a cryogenic environment 160 by means of securing fixture 165.

Figure 6A:
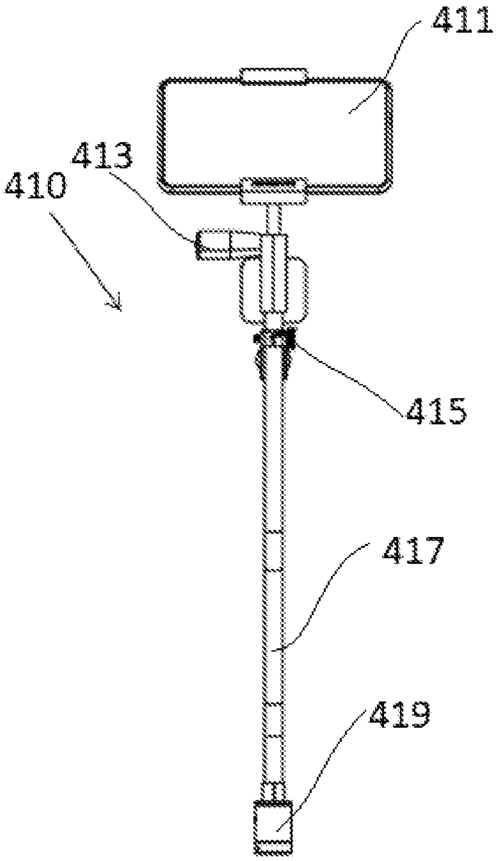
FIGS. 6*a* and 6*b* are front and side views of a thermally isolated sensor arrangement.
Figure 6B:
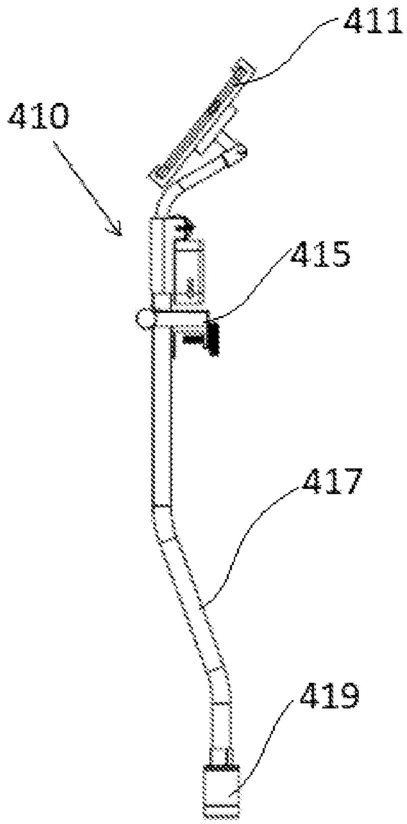

Reference is now made to FIGS. 6*a* and 6*b* presenting front and side views of exemplary embodiment 410 of sensor arrangement. Embodiment 410 includes display 411, articulated tubular member 417, fixture 415 for securing the sensor arrangement within the cryogenic environment (not shown), handle 413 and casing 419 accommodating sensor 110 (FIGS. 2*a*-*b*).

Figure 7A:
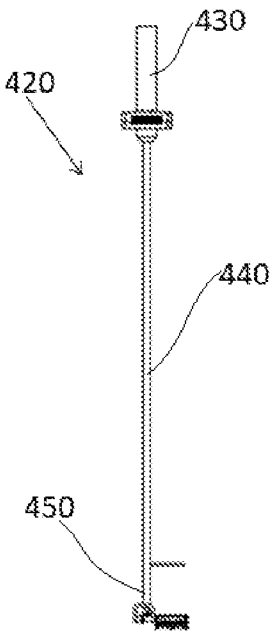
FIGS. 7*a* to 7*c* are a general appearance of a grasper and enlarged views of proximal and distal portions, respectively.
Figure 7B:
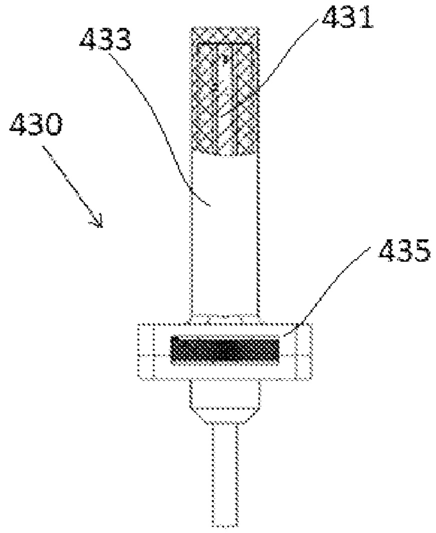
Figure 7C:
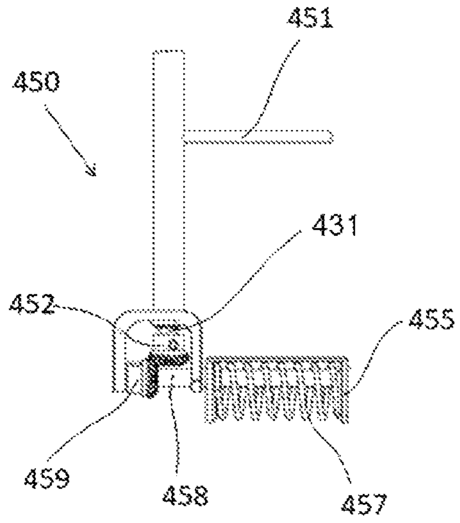

Reference is now made to FIGS. 7*a*, 7*b* and 7*c* presenting a general appearance of a grasper and enlarged views of proximal and distal portions, respectively. As shown in FIG. 7*a*, grasper 420 comprises a tubular member 440 having an internal shaft (not shown), proximal portion 430 and distal portion 450. In FIG. 7*b*, proximal portion 430 has handle 433 integrally embodied with internal shaft 431 and manually rotatable by one hand of user. The member 435 connected to tubular member 440 (not shown) is held by another hand of user such as internal shaft 431 is rotated relative to tubular member 440. Referring to FIG. 7*c*, distal portion 450 includes conical pinion gear 452 mechanically connected to shaft 431 which is in engagement with conical idle gear 459 connected to shaft 458 bracketed within clamp. Shaft 458 carries spring 457 coiled thereon. The pitch of spring 457 is chosen to be effective for grasping an object of interest by pressing the object of interest between spring coils.

Figure 8A:
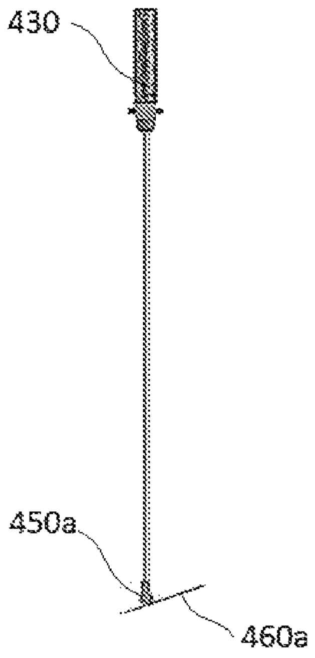
FIGS. 8*a* and 8*b* are views of a grasper after grasping an object of interest and before releasing thereof.
Figure 8B:
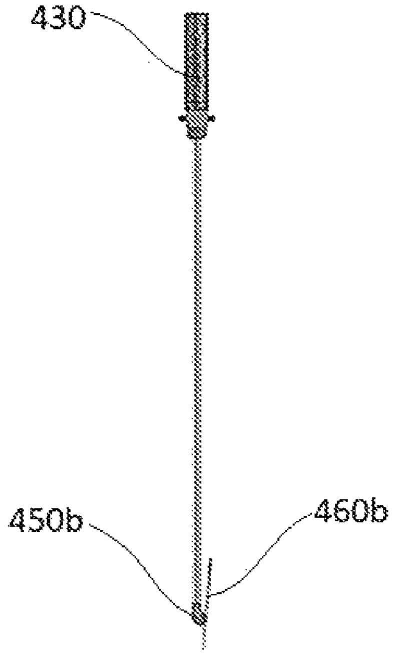

Reference is now made to FIGS. 8*a* and 8*b* showing the grasper after grasping an object of interest and before releasing thereof. Specifically, in FIG. 8*a*, the distal portion in position 450*a* holds an object of interest in position 460*a* after grasping it at the bottom internal surface of the cryogenic environment. FIG. 8*b* relates to the position 450*b* of the distal portion after turning the object of interest into position 460*b* before releasing it from the spring.

Figure 9A:
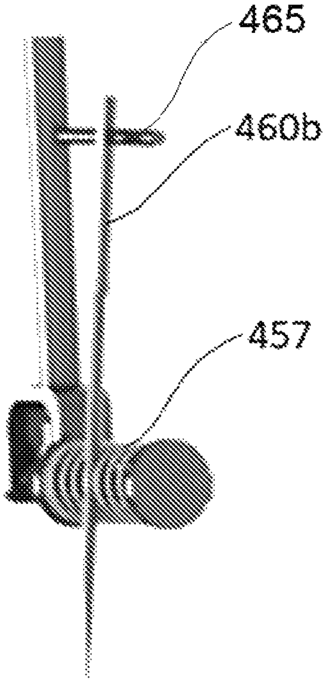
FIGS. 9*a* and 9*b* illustrates a releasing operation mode of a grasper.
Figure 9B:
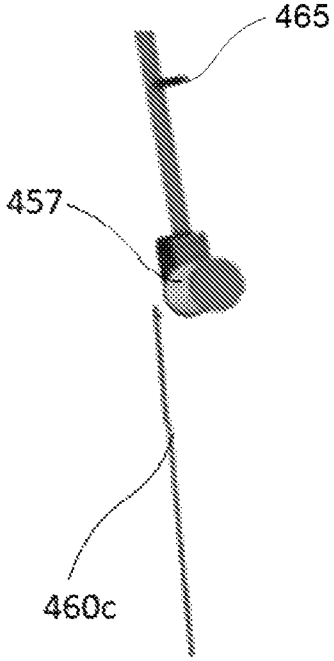

Reference is now made to FIGS. 9*a* and 9*b* illustrating releasing the object of interest in position 460 from spring 457. Specifically, when spring is rotated in a clockwise direction, the object of interest comes into contact with stop 465 and is releases from spring 457.

Figure 10:
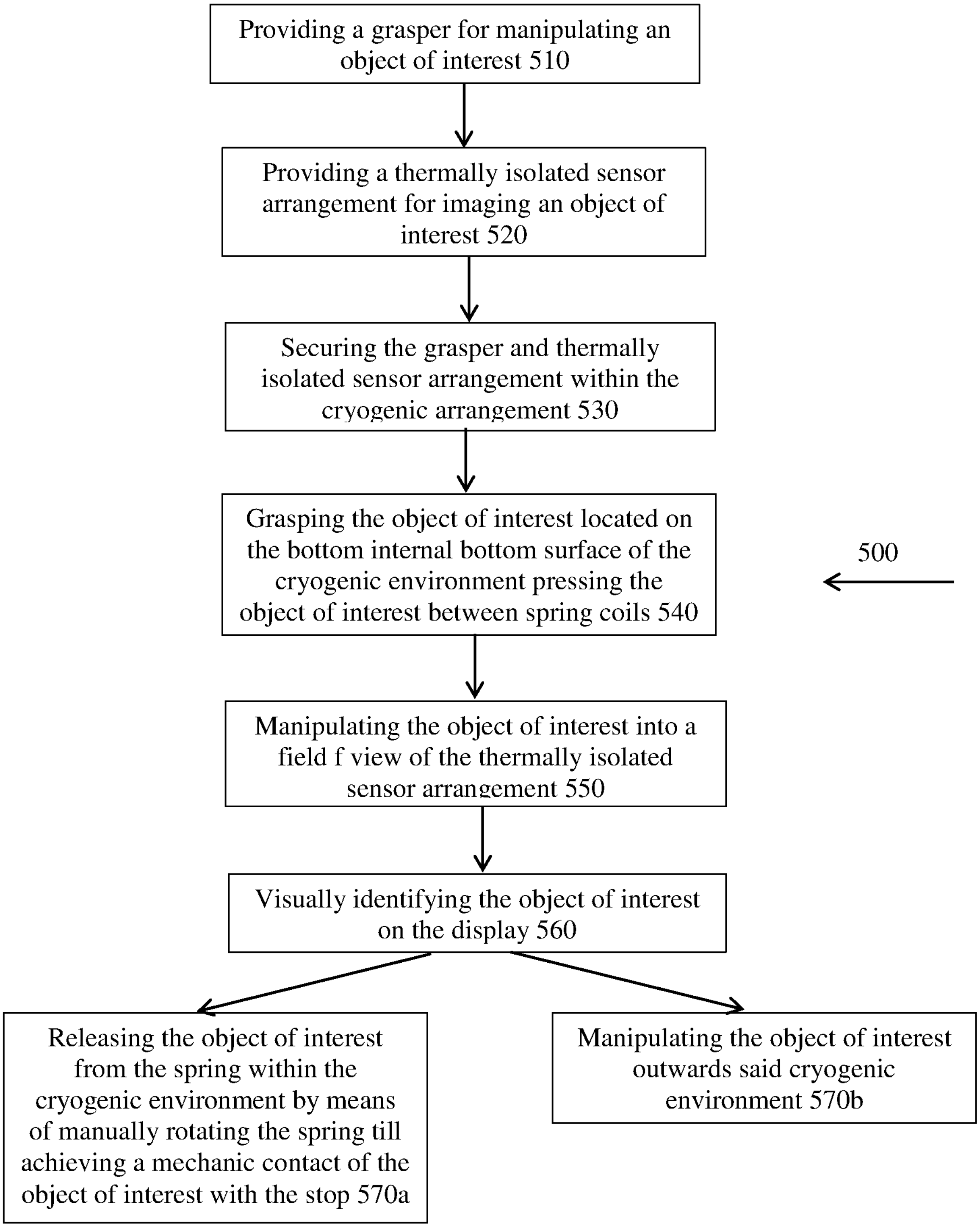
FIG. 10 is a flowchart of a method of manipulating an object of interest in a cryogenic environment.

Reference is now made to FIG. 10 presenting a flowchart of method 500 of manipulating an object of interest in a cryogenic environment. At steps 510 and 520, grasper for manipulating an object of interest and a thermally isolated sensor arrangement for imaging an object of interest, respectively, are provided. The grasper and sensor are secured within the cryogenic environment (step 530). The object of interest located on the internal bottom surface of the cryogenic environment is grasped by pressing the object of interest between spring coils (step 540). The grasped object of interest is manipulated into the field of view of the sensor (step 550) and visually identified on the display. As needed, the object of interest is released from the spring within the cryogenic environment by means of manually rotating the spring till achieving a mechanic contact of the object of interest with the stop (step 570*a*) or manipulated outwards the cryogenic environment (step 570*b*).

According to the present invention, a sensor arrangement for imaging an object of interest within a cryogenic environment is disclosed. The aforesaid cryogenic arrangement comprises: (a) a sensor configured for imaging the object of interest; (b) a light source configured for illuminating the object of interest; (c) vacuum-sealed housing accommodating the sensor and light source; the housing having an aperture and an optical window mounted within the aperture; and (d) means for securing the sensor and light source within the housing.

It is a core feature of the invention to provide the means for the sensor and light source further comprising a wire suspension characterized by low thermal conductivity.

According to one embodiment the present invention, the cryogenic environment is a cryogenic device for storing biological objects.

According to a further embodiment the present invention, the biological object is selected from the group consisting of a seminal fluid, an embryo, an egg and any combination thereof.

According to a further embodiment the present invention, the an internal wall of the sealed housing is lined with a film-shaped aluminized biaxially-oriented polyethylene terephthalate.

According to a further embodiment the present invention, the wire suspension is made of polyparaphenylene terephthalamide or polyamide fibers.

According to a further embodiment the present invention, the optical window is made of quartz and glued within the aperture by means of an epoxy encapsulant.

According to a further embodiment the present invention, the sensor is a CMOS sensor.

According to a further embodiment the present invention, the light source is an array of light emitting diodes.

According to a further embodiment the present invention, the array is annularly shaped around the sensor.

A further object of the invention is to disclose the grasper comprises a tubular member and a shaft accommodated within the tubular member. The shaft has a proximal end and a distal end thereof; the proximal end is provided with a handle for manually rotating the shaft relating to the tubular member. The gasper further comprises a bevel gear secured to the tubular member. The bevel gear comprises a pinion and an idle gear. The pinion is mechanically connected to the distal end of the shaft. The idle gear mechanically connected to a spindle bracketed to the tubular member. The spindle carries a coiled spring having a pitch thereof effective for grasping and releasing the object of interest by a resilient manner. The object of interest when located on an internal bottom surface of the cryogenic environment is graspable by pressing the object of interest between spring coils. The grasper further comprises a stop member. The object of interest when grasped is manually rotatable by means of the handle via the shaft and the bevel gear till achieving a mechanic contact with the stop releasing the object of interest from the spring.

According to a further embodiment the present invention, a further object of the invention is to disclose an arrangement for manipulating an object of interest within a cryogenic environment is disclosed. The aforesaid arrangement comprises: (a) a grasper configured for placing the object of interest into the cryogenic environment and retrieving the object of interest therefrom; (b) a cryogenic arrangement for imaging an object of interest within a cryogenic storing device; the cryogenic arrangement comprising: (i) a sensor configured for imaging the object of interest; (ii) a light source configured for illuminating the object of interest; (iii) a vacuum-sealed housing accommodating the sensor and light source; the housing having an aperture and an optical window mounted within the aperture; (iv) means for securing the sensor and light source within the housing; (v) means for displaying the object of interest captured by the sensor. The means for securing the sensor and light source further comprises a wire suspension characterized by low thermal conductivity.

According to a further embodiment the present invention, a method of imaging an object of interest within a cryogenic environment and manipulating thereof is disclosed. The aforesaid method comprises steps of: (a) providing arrangement for manipulating an object of interest within a cryogenic environment; the arrangement comprising: (i) a grasper configured for placing the object of interest into the cryogenic environment and retrieving the object of interest therefrom; (ii) a cryogenic arrangement for imaging an object of interest within a cryogenic storing device; the cryogenic arrangement comprising: (1) a sensor configured for imaging the object of interest; (2) a light source configured for illuminating the object of interest; (3) a vacuum-sealed housing accommodating the sensor and light source; the housing having an aperture and an optical window mounted within the aperture; (4) means for securing the sensor and light source within the housing; (5) means for displaying the object of interest captured by the sensor; the means for securing the sensor and light source further comprises a wire suspension characterized by low thermal conductivity; (b) performing a step selected from the group consisting of: grasping the biological object by the grasper; placing the biological object into the cryogenic environment; imaging the biological object within the cryogenic environment; retrieving the biological object from the cryogenic environment and any combination thereof.

According to a further embodiment the present invention, a method of manufacturing a thermally isolated sensor arrangement for imaging an object of interest within a cryogenic environment is disclosed. The aforesaid method comprises steps of: (a) providing components of the thermally isolated sensor arrangement comprising: (i) a sensor configured for imaging the object of interest; (ii) a light source configured for illuminating the object of interest; (iii) a sealable housing accommodating the sensor and light source; the housing having an aperture and an optical window mounted within the aperture; the sealable housing having two parts configured for cooperatively forming a sealed housing; (iv) means for securing the sensor and light source within the housing further comprising a wire suspension characterized by low thermal conductivity; (v) means for sealing the thermally isolated sensor arrangement further comprising an O-ring and an epoxy encapsulating material; (vi) means for thermally isolating the sensor arrangement from the cryogenic environment; the means for thermally isolating further comprising film-shaped aluminized biaxially-oriented polyethylene terephthalate; (b) lining the an internal wall of the sealable housing with film-shaped aluminized biaxially-oriented polyethylene terephthalate; (c) suspending the sensor and light source within the sealable housing; (d) placing the O-ring between the two parts of the sealable housing; (e) vacuuming the sealable housing; and (f) sealing the sealable housing by means of the epoxy encapsulating material.

According to a further embodiment the present invention, the O-ring is plated with Silver-Indium.

According to a further embodiment the present invention, a method of manipulating an object of interest in a cryogenic environment is disclosed. The aforesaid method comprises: (a) providing a grasper for manipulating an object of interest in a cryogenic environment; the grasper comprising a tubular member and a shaft accommodated within the tubular member; the shaft has a proximal end and a distal end thereof; the proximal end is provided with a handle for manually rotating the shaft relating to the tubular member; the gasper further comprises a bevel gear secured to the tubular member; the bevel gear comprises a pinion and an idle gear; the pinion is mechanically connected to the distal end of the shaft; the idle gear mechanically connected to a spindle bracketed to the tubular member; the spindle carries a coiled spring having a pitch thereof effective for grasping and releasing the object of interest by a resilient manner; the object of interest when located on an internal bottom surface of the cryogenic environment is graspable by pressing the object of interest between spring coils; the grasper further comprises a stop member; the object of interest when grasped is manually rotatable by means of the handle via the shaft and the bevel gear till achieving a mechanic contact with the stop and releasing the object of interest from the spring; (b) providing a thermally isolated sensor arrangement for imaging an object of interest within a cryogenic environment; the arrangement comprising: (i) a sensor configured for imaging the object of interest; (ii) a light source configured for illuminating the object of interest; (iii) a vacuum-sealed housing accommodating the sensor and light source; the housing having an aperture and an optical window mounted within the aperture; and (iv) a display connected to the sensor and configured for visualizing the cryogenic environment captured by the sensor; (c) securing the grasper and thermally isolated sensor arrangement within the cryogenic arrangement; (d) grasping the object of interest located on the bottom internal bottom surface of the cryogenic environment pressing the object of interest between spring coils; (e) manipulating the object of interest into a field of view of the thermally isolated sensor arrangement; (f) visually identifying the object of interest on the display; (g) alternatively manipulating the object of interest outwards the cryogenic environment or releasing the object of interest from the spring within the cryogenic environment by means of manually rotating the spring till achieving a mechanic contact of the object of interest with the stop.

The invention claimed is:

1. A thermally isolated sensor arrangement for imaging an object of interest within a cryogenic environment; said arrangement comprising:

- a. a sensor configured for imaging said object of interest;
- b. a light source configured for illuminating said object of interest;
- c. a vacuum-sealed housing accommodating said sensor and light source; said housing having an aperture and an optical window mounted within said aperture; and
- d. means for securing said sensor and light source within said housing;

wherein said means for securing said sensor and light source further comprises a wire suspension characterized by low thermal conductivity, further wherein said means for securing said sensor and light source is mounted on said housing, and secures only said sensor and light source, and wherein said light source is an array of light emitting diodes, and said array is annularly shaped around said sensor.

2. The arrangement according to claim 1, wherein at least one of the following is true:

- a. said cryogenic environment is a cryogenic device for storing biological objects;
- b. an internal wall of said vacuum-sealed housing is lined with film-shaped aluminized biaxially-oriented polyethylene terephthalate:
- c. said wire suspension is made of polyparaphenylene terephthalamide fiber;
- d. said optical window is made of quartz and glued within said aperture by means of an epoxy encapsulant; or
- e. said sensor is a CMOS sensor.

3. The arrangement according to claim 2, wherein said biological object are selected from the group consisting of a seminal fluid, an embryo, an egg or any combination thereof.

4. A system for manipulating an object of interest within a cryogenic environment; said system comprising:

- a. a grasper configured for placing said object of interest into said cryogenic environment and retrieving said object of interest therefrom; and
- b. a cryogenic arrangement for imaging an object of interest within a cryogenic storing device;

said cryogenic arrangement comprising:

- i. a sensor configured for imaging said object of interest;
- ii. a light source configured for illuminating said object of interest, wherein said light source is an array of light emitting diodes, and wherein said array is annularly shaped around said sensor;
- iii. a housing accommodating said sensor and light source; said housing having an aperture and an optical window mounted within said aperture;
- iv. means for securing said sensor and light source within said housing; and
- v. means for displaying said object of interest captured by said sensor;

wherein said means for securing said sensor and light source further comprises a wire suspension characterized by low thermal conductivity;

further wherein said means for securing said sensor and light source is mounted on said housing, and secures only said sensor and light source.

5. The system according to claim 4, wherein at least one of the following is true:

- a. said cryogenic environment is a cryogenic device for storing biological objects; or
- b. an internal wall of said housing is vacuum-sealed and lined with film-shaped aluminized biaxially-oriented polyethylene terephthalate.

6. The system according to claim 5, wherein said biological objects are selected from the group consisting of a seminal fluid, an embryo, an egg and any combination thereof.

7. The system according to claim 4, wherein said wire suspension is made of polyparaphenylene terephthalamide fibers.

8. The system according to claim 4, wherein said optical window is made of quartz and glued within said aperture by means of an epoxy encapsulant.

9. The system according to claim 4, wherein said sensor is a CMOS sensor.

10. The system according to claim 4, wherein said grasper comprises a tubular member and a shaft accommodated within said tubular member, said shaft has a proximal end and a distal end thereof; said proximal end is provided with a handle for manually rotating said shaft relating to said tubular member;

said gasper further comprises a bevel gear secured to said tubular member;

said bevel gear comprises a pinion and an idle gear;

said pinion is mechanically connected to said distal end of said shaft;

said idle gear mechanically connected to a spindle bracketed to said tubular member;

said spindle carries a coiled spring having a pitch thereof effective for grasping and releasing said object of interest by a resilient manner;

said object of interest when located on an internal bottom surface of said cryogenic environment is graspable by pressing said object of interest between spring coils; and said grasper further comprises a stop member; said object of interest when grasped is manually rotatable by means of said handle via said shaft and said bevel gear till achieving a mechanic contact with said stop member releasing said object of interest from said spring.

11. A thermally isolated sensor arrangement for imaging an object of interest within a cryogenic environment; said arrangement comprising:

a. a sensor configured for imaging said object of interest;

b. a light source configured for illuminating said object of interest;

c. a vacuum-sealed housing accommodating said sensor and light source; said housing having an aperture and an optical window mounted within said aperture, wherein said vacuum-sealed housing comprises two parts and an O-ring placed between said two parts of said vacuum-sealed housing; and d. means for securing said sensor and light source within said housing;

wherein said means for securing said sensor and light source further comprises a wire suspension characterized by low thermal conductivity, further wherein said means for securing said sensor and light source is mounted on said housing, and secures only said sensor and light source, and wherein at least one of the following is true:

a. said cryogenic environment is a cryogenic device for storing biological objects;

b. an internal wall of said vacuum-sealed housing is lined with film-shaped aluminized biaxially-oriented polyethylene terephthalate:

c. said wire suspension is made of polyparaphenylene terephthalamide fiber;

d. said optical window is made of quartz and glued within said aperture by means of an epoxy encapsulant; or e. said sensor is a CMOS sensor; or f. said light source is an array of light emitting diodes.

12. The arrangement according to claim 11, wherein said O-ring is plated with Silver-Indium.

* * * * *